United States Patent [19]
Blaker

[11] Patent Number: 5,903,063
[45] Date of Patent: May 11, 1999

[54] IGNITION SENSOR CIRCUIT

[75] Inventor: David A. Blaker, Holland, Mich.

[73] Assignee: Prince Corporation, Holland, Mich.

[21] Appl. No.: 08/837,447

[22] Filed: Apr. 14, 1997

[51] Int. Cl.$^6$ ...................................................... H02J 7/00
[52] U.S. Cl. ........................ 307/10.6; 307/10.1; 307/10.8
[58] Field of Search ..................................... 307/9.1, 10.1,
307/10.6, 10.7, 10.8; 322/58, DIG. 6; 340/438;
701/36; 327/379, 384; 320/136

[56] References Cited

U.S. PATENT DOCUMENTS

| | | | |
|---|---|---|---|
| 4,733,100 | 3/1988 | Nusairat et al. | 307/9.1 |
| 5,073,721 | 12/1991 | Terrill et al. | 307/10.1 |
| 5,130,659 | 7/1992 | Sloan | 320/136 |
| 5,204,991 | 4/1993 | Law | 307/10.7 |
| 5,459,357 | 10/1995 | Minks | 307/10.7 |
| 5,510,657 | 4/1996 | Morita | 307/9.1 |
| 5,583,485 | 12/1996 | Van Lente et al. | |

*Primary Examiner*—Richard T. Elms
*Attorney, Agent, or Firm*—Price, Heneveld, Cooper, DeWitt & Litton

[57] ABSTRACT

A control circuit comprises a plurality of amplifier and filter stages for detecting ignition noise present on the battery line of a vehicle. It applies the filtered and amplified ignition noise signal to a hysteresis latch circuit for providing a control output signal for a solid-state switch coupled between the vehicle battery conductor and a load. Such a circuit provides accurate detection of only ignition noise to provide operating power from a battery line to a circuit to be powered thereby and is immune from extraneous noise frequencies and voltage levels.

22 Claims, 2 Drawing Sheets

น,903,063

IGNITION SENSOR CIRCUIT

BACKGROUND OF THE INVENTION

The present invention relates to a circuit for controlling the application of battery power from a vehicle battery line to an electrical circuit upon detection of ignition noise on the battery line. In vehicle accessories, such as overhead consoles which house electrical components such as HomeLink® transmitters of the type disclosed in U.S. Pat. No. 5,583,485, it is desirable to power such devices only when the vehicle is in operation, which typically is accomplished by an ignition conductor which applies battery voltage to such conductors when the ignition switch is activated. The utilization of ignition conductors, however, requires that a separate line be extended from the ignition switch to the overhead console area of the vehicle, which is both costly and somewhat difficult. On the other hand, a battery conductor for allowing the manual activation of courtesy lights under any conditions is typically extended to the overhead console so that overhead lights can be employed with the ignition in an off position. Thus, there exists a battery conductor in the overhead console area, and it is desirable to use such conductor for other applications only when the ignition is on.

In the past, some electrical circuits have been provided to selectively provide operating power to such items as radar detectors and the like upon detection of ignition noise. Such prior art circuits, however, require that the circuit be built into the vehicle's alternator itself or directly associated with the engine computer. It is desired to provide a circuit which can be independently mounted remotely from the engine compartment of the vehicle and coupled to a vehicle battery supply line but provide operating power only when the vehicle engine is in operation. Such an application can, for example, be for back lighting of display panels in an overhead console, which back lighting is desired to be present whenever the vehicle is in operation so that the operator can see the various back lighted control switches or displays which may be associated with such electrical circuits as garage door opening transmitters, paging receivers, message centers and the like, which have back lighted control switches, both during day light and night time driving conditions. Further, it is desirable to have a system which accurately detects ignition noise to provide operating power only when the ignition is activated and not upon detection of other transient signals, as well as a system by which power, once applied, remains on until the ignition is turned off.

SUMMARY OF THE PRESENT INVENTION

The circuit of the present invention provides the desired control functions by utilizing an electrically-actuated solid-state switch coupled between the battery supply line of a vehicle and a circuit to be activated thereby. The solid-state switch includes a control input terminal coupled to a control circuit of the present invention. The control circuit comprises a plurality of filters and amplifier stages for detecting ignition noise present on the battery line and a hysteresis latch circuit for applying a control signal to the solid-state switch such that it remains on once activated until the noise drops below a predetermined threshold. Such a circuit thereby provides accurate detection of only ignition noise to provide operating power from a battery line to a circuit to be powered thereby and is immune from extraneous noise frequencies and voltage levels.

These and other features, objects and advantages of the present invention will become apparent upon reading the following description thereof together with reference to the accompanying drawings.

DETAILED DESCRIPTION OF THE PREFERRED EMBODIMENT

Figure 1:
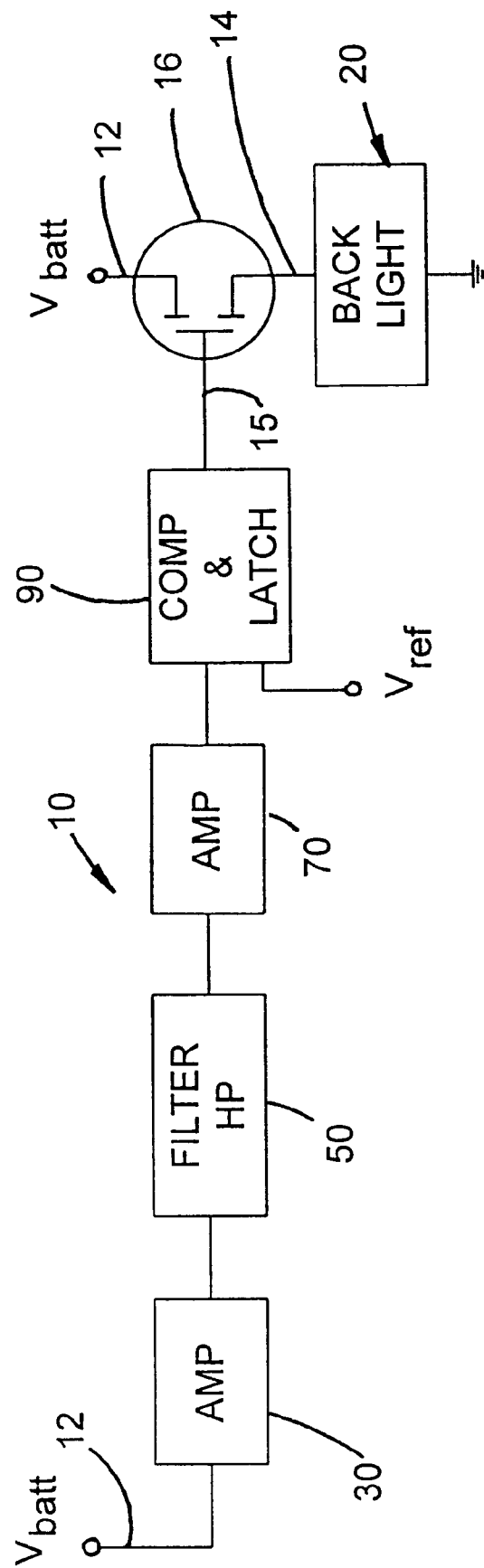
FIG. 1 is an electrical circuit diagram in block form of the circuit of the present invention.

Referring initially to FIG. 1, there is shown an electrical circuit 10 for supplying voltage from a battery line 12 coupled to the vehicle's battery and extending through a suitable wire harness to the overhead console area of the vehicle such that dome lights, courtesy lights and the like can be powered without the ignition being activated. Such battery conductors 12 are conventional. Typically, an ignition line is also run to the overhead console for activating other vehicle electronic devices such as remote garage door opening transmitters, compass displays, two-way communication paging transceivers and other vehicle displays. It is desired, however, to eliminate the need for such an ignition-only activated conductor and the circuit 10 provides, in effect, a pseudo ignition conductor 14 through a solid-state switch 16 for applying power to a circuit 20 to be activated by power from the battery line 12 through solid-state switch 16 only when ignition noise is accurately detected. Thus, conductor 14 serves as an ignition power conductor only when circuit 10 detect. ignition noise, thus, eliminating the need for an actual ignition conductor to be run from the vehicle's ignition switch to the overhead area or other areas of the vehicle in which the circuit may be used.

Circuit 10 comprises, in the preferred embodiment, a first amplifier 30 having an input AC coupled to the battery conductor 12 and having a gain of approximately 50 for amplifying high frequency noise as described in greater detail in connection with FIG. 2. The output of amplifier 30 is coupled to an active two-pole high-pass filter 50 having a roll-off frequency of approximately 2500 Hz to pass frequencies above 2500 Hz. The output of filter 50 is coupled to a second amplifier 70 which again has a gain of approximately 50 and supplies the amplified and filtered signals from high-pass filter 50 to a comparator and latch circuit 90 having one input coupled to al adjustable voltage reference $V_{ref}$ and another input coupled to the output of amplifier 70. The output of the comparator and latch circuit 90 is applied to the control input terminal 15 of solid-state switch 16 which can be an FET which has an input terminal coupled to the battery conductor 12 and output terminal coupled to the ignition simulating conductor 14 and to the circuit 20, which receive operating power. The comparator and latch circuit 90 is selected to respond only to those frequency, signals from amplifier 70 which exceed a predetermined threshold determined by $V_{ref}$ and, upon exceeding such threshold, provides a control signal at its output terminal until the voltage level fall to a predetermined level below $V_{ref}$, thus providing a hysteresis latch for the circuit 90 assuring that power is applied to the circuit 20 once ignition noise is detected until the noise level reliably fall below a predetermined level. The schematic circuit for the control circuit 10 shown in FIG. 1 i shown in FIG. 2 and is now described.

Figure 2:
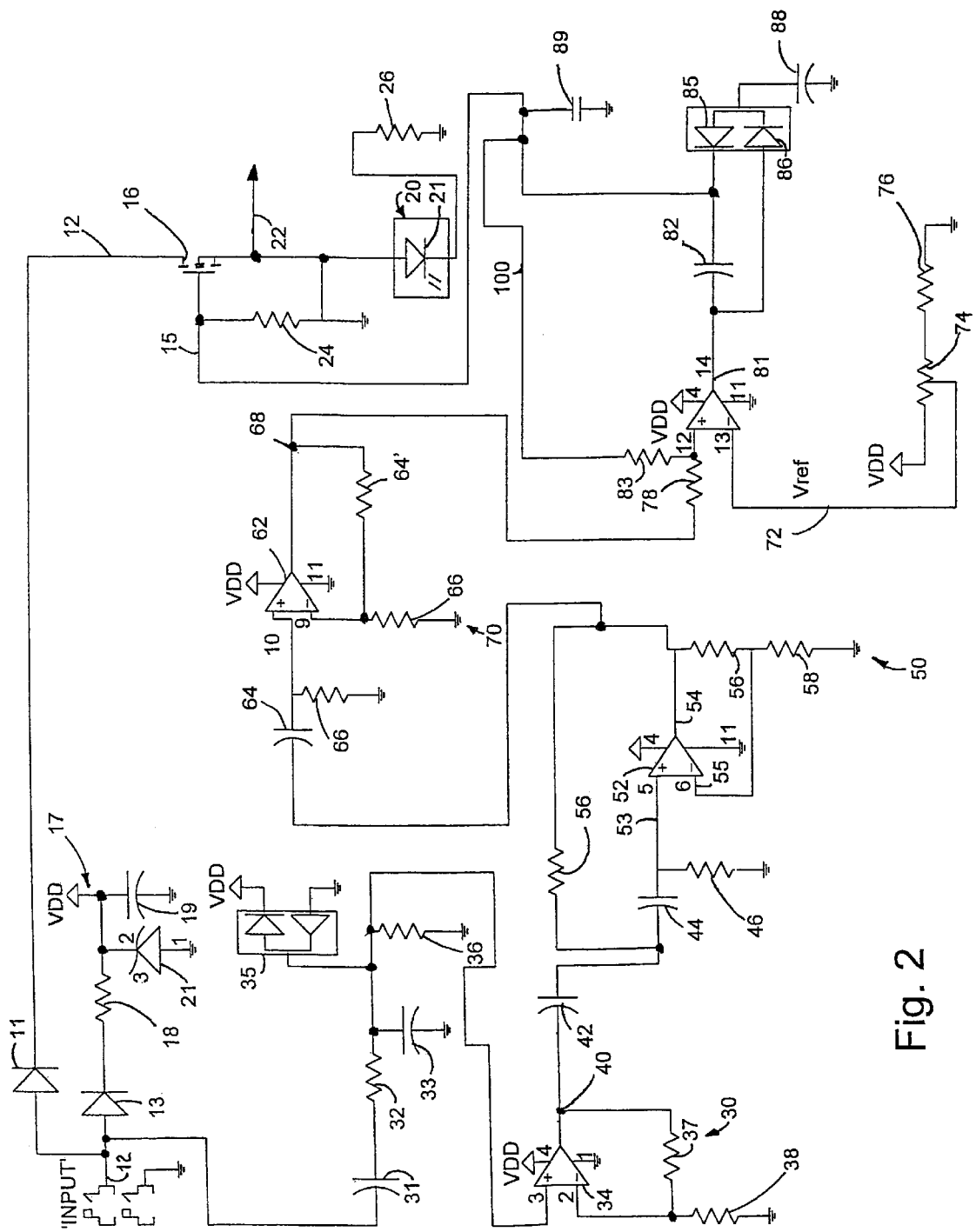
FIG. 2 is an electrical circuit diagram in schematic form of the circuit of the present invention.

Referring to FIG. 2, line 12 is coupled directly to the vehicle's battery $V_{battery}$ and is couple through first and second diodes 11 and 13 to the solid-state switch 16 and a power supply 17 respectively. Supply 17 includes a 24-volt zener diode 21 limiting the voltage excursion as well a an integrating resistor/capacitor 18 and 19 to provide a power supply voltage $V_{DD}$, which i conventionally applied to the various other circuit components as illustrated by the interconnection of the $V_{DD}$ circuit terminals in FIG. 2.

Noise on the input conductor 12 is capacitively (i.e. AC) coupled to amplifier 30 by an input capacitor 31 and through an integrator comprising resistor 32 serially coupled to capacitor 31 an a capacitor 33 coupled to the junction of resistor 32 and the input of an operational amplifier 34 which can be an LM2902 integrated circuit. A bleeder resistor 36 is also coupled to the input terminal of operational amplifier 34, and a clamping circuit 35 is coupled to the input and to $V_{DD}$ to limit the input signal applied to the input of amplifier 30 to substantially positive voltages. Amplifier 30 includes conventional feedback resistors 37 and 38 to provide a gain of approximately 50 at its output terminal 40. The output 40 of amplifier 30 is applied to the input of a two-pole active filter 50 comprising a pair of serially coupled capacitors 42 and 44 having their junction coupled to the output terminal 54 of an operational amplifier 52. The input terminal 53 of amplifier 52 is coupled to the terminal of capacitor 44 remote from capacitor 42 and to ground through resistor 46. A feedback resistor 56 extends from the output terminal 54 of amplifier 52 to the junction of capacitors 42 and 44, each having a value of 0.01 microfarads. The output terminal 54 of operational amplifier 52 is coupled to a pair of serially coupled resistors 56 and 58 coupled to ground with the junction of the resistors coupled to the negative input terminal 55 of operational amplifier 52. Amplifier 52, like amplifier 34, can be part of a single integrated circuit LM2902, which is also employed for the successive amplifier stage 70 with the pin numbers being identified in FIG. 2.

The two-pole, high-pass active filter 50 effectively passes only frequencies above 2500 Hz, thereby eliminating low frequency transient noise which may be induced from adjacent power lines or other extraneous sources. Since ignition noise typically falls within a range above 2500 Hz, the amplified signals from active filter 50 represents noise frequency signals which accurately represent the ignition noise of interest.

The output terminal of 54 of filter 50 is coupled to the input terminal 60 of an operational amplifier 62 forming part of amplifier 70 through a coupling capacitor 64 and input resistor 66, as seen in FIG. 2. Amplifier 70 provides a gain of approximately 50 to the input signals applied al input terminal 60 through the selection of feedback resistors 64 and 66 coupled from the output terminal 68 of amplifier 70 to the negative input terminal as shown. Output terminal 68 of amplified 70, which provides an output voltage of the AC ignition noise signals in the range of from about 2 to 5 volts, is coupled to one input of the comparator latch circuit 90. The noise signal voltage in some cases can reach the clamping level of about 10 volts.

The comparator latch circuit provides at its output terminal 100 coupled to input terminal 15 of solid-state switch 16 either logic '0' or logic '1' depending upon the detection of ignition frequency noise which is above a predetermined threshold determined by the voltage reference applied by conductor 72 from a reference voltage source comprising a potentiometer 74 and a series couple resistor 76 coupled between $V_{DD}$ and ground. The reference voltage is selected to be approximately 5.5 to 7 volts depending upon the vehicle and is applied at the negative input terminal of operational amplifier 80. This reference voltage is selected for a given vehicle such that switch 16 will be actuated upon vehicle engine ignition only. The output of amplifier 62 is coupled to the positive input terminal of amplifier 80 by means of a serially coupled resistor 78 and the output of amplifier 80 is coupled to conductor 100 through diode 84. A charge pump, including capacitor 82, diode 86 and capacitor 88, approximately doubles the output voltage applied to conductor 100 such that a low-cost switch 16 can be employed. The output terminal 81 of amplifier 80, when the input exceeds the reference voltage, will go to about 10 volts and charge capacitor 88 through forward biased diode. As the cycle of noise voltage drops and amp 80 turns off, the charge on capacitor 88 transfers, in part, to capacitor 82 through diode 85. After several cycles of such noise which exceeds the threshold $V_{ref}$, the output voltage applied to conductor 100 through diode 84 charges capacitor 89. This voltage is fed back to the input of amplifier 80 via resistor 83 to latch amplifier 80 on as described below. As a result, the voltage on conductor 100 reaches approximately 2 $V_{DD}$, a level sufficient to provide a logic '1' to switch 16 for its actuation.

The feedback of the voltage at output 100 to the input of amplifier 80 through resistor 83 provides hysteresis by raising the amplitude of the input signal once the $V_{ref}$ signal has been reached or exceeded over a few cycles of detected ignition noise such that the logic '1' signal at output terminal 100 will remain even when the input voltage from amplifier 70 drops below the threshold $V_{ref}$. Amplifier 80 will remain on until such time as the input voltage from amplifier 70 decreases approximately one to two volts below the $V_{ref}$, allowing capacitor 89 to discharge through a 1 mega ohm bleeder resistor 24.

The logic '1' (i.e. 2 $V_{DD}$) signal on conductor 100 is applied to the gate or control terminal 15 of solid-state switch 16 allowing a relatively inexpensive FET 16 to be employed for coupling the battery conductor 12 to the load circuit 20. As seen in FIG. 2, circuit 20 is represented by a light-emitting diode 21 for back-lighting a switch or display, although the output 22 from switch 16 can be applied to any number of other circuits. A resistor 26 coupled in series with the load 20 limits the current. By using the latch circuit 90, the load 20 will be activated as long as ignition noise is reliably detected. Thus, if the ignition noise fluctuates, which is somewhat typical, the hysteresis provided by the charge pump of circuit 90 will assure that power is applied to the load as ignition noise varies.

Thus, with the circuit of the present invention, ignition noise is reliably filtered, detected and employed with a hysteresis latch circuit to provide a control signal used to assure power is selectively applied from a battery conductor of a vehicle to a load. The circuit provides a reliable noise immune system for providing such operational power without the need for an ignition conductor in areas of the vehicle, such as the overhead console, where the provision of such a conductor can be expensive and difficult.

It will become apparent to those skilled in the art that various modifications to the preferred embodiments of the invention as described herein can be made without departing from the spirit or scope of the invention as defined by the appended claims.

The embodiments of the invention in which an exclusive property or privilege is claimed are defined as follows:

1. An ignition noise detection and control circuit comprising:
   a first amplifier including an input and an output;
   means for AC coupling said input of said first amplifier to a vehicle battery line;

a high-pass filter having an input terminal coupled to said output of said first amplifier and an output terminal for passing signals having a frequency above a predetermined frequency;

a second amplifier having an input terminal coupled to the output of said filter for amplifying signals from said filter, said second amplifier including an output terminal;

a comparator and latch circuit having a first input terminal coupled to the output terminal of said second amplifier and a reference voltage input terminal, said comparator and latch circuit responding to signals from said second amplifier to provide a control output signal at an output terminal thereof when the input signals from said second amplifier exceed said voltage reference; and a switch having a control input terminal coupled to the output of said comparator and latch circuit, an input terminal coupled to a vehicle battery line, and an output terminal for applying power to a load circuit to be activated only upon ignition of the vehicle.

2. The circuit as defined in claim 1 and further including a control circuit coupled to the output of said switch for receiving operating power therefrom.

3. The circuit as defined in claim 1 wherein said high-pass filter passes frequencies above about 2500 Hz.

4. The circuit as defined in claim 3 wherein said comparator and latch circuit comprises an operational amplifier having a feedback control circuit providing a hysteresis latching of said amplifier operational to an on state.

5. The circuit as defined in claim 4 wherein said feedback circuit includes a first diode having an anode coupled to the output of said operational amplifier and a cathode coupled to a capacitor having a terminal remote therefrom coupled to ground;

a second diode having an anode coupled from the junction of said cathode of said first diode to said capacitor and a cathode coupled to one terminal of a second capacitor having its terminal remote therefrom coupled to the output of said operational amplifier; and a third diode having an anode coupled to the junction of said second capacitor and said cathode of said second diode and a cathode coupled to the positive input terminal of said operational amplifier through a resistor to provide hysteresis latching of said operational amplifier.

6. The circuit as defined in claim 5 and further including a voltage reference source for providing said voltage reference, said voltage reference source comprising a resistive divider network coupled from a source of operating power to ground and having an output terminal coupled to the remaining input terminal of said operational amplifier.

7. The circuit as defined in claim 1 wherein said load circuit comprises a light source.

8. The circuit as defined in claim 7 wherein said light source comprises a light emitting diode.

9. An ignition noise detection and control circuit comprising:

a first amplifier;

a high-pass filter coupled to said first amplifier for passing signals having a frequency above a predetermined frequency;

a second amplifier coupled to said filter for amplifying signals from said filter; and a latch circuit including an operational amplifier, a first diode having an anode coupled to an output of said operational amplifier and a cathode coupled to a capacitor having a terminal remote therefrom coupled to ground, a second diode having an anode coupled from the junction of sail cathode of said first diode to said capacitor and cathode coupled to one terminal of a second capacitor having its terminal remote therefrom coupled to said output of said operational amplifier a third diode having an anode coupled to the junction of said second capacitor and said cathode of said second diode and a cathode coupled to an input terminal of said operational amplifier through a resistor to provide hysteresis latching of the output of said operational amplifier.

10. The circuit as defined in claim 9 wherein said operational amplifier includes a second input terminal coupled to a reference voltage source to compare signals on said first named input terminal with said reference voltage.

11. The circuit as defined in claim 10 and further including a solid-state switch having a control input terminal coupled to the output of said operational amplifier, an input terminal coupled to a vehicle battery line, and an output terminal for applying power to a load circuit to be activated only upon ignition of the vehicle.

12. The circuit as defined in claim 11 wherein said high-pass filter passes frequencies substantially above 2500 Hz.

13. The circuit as defined in claim 12 wherein said voltage reference source comprises a variable resistive divider network coupled from a source of operating power to ground and having an output terminal coupled to the remaining input terminal of said operational amplifier.

14. The circuit as defined in claim 13 wherein said solid-state switch comprises an FET.

15. The circuit as defined in claim 14 wherein said load circuit comprises a light source.

16. The circuit as defined in claim 15 wherein said light source comprises a light emitting diode.

17. An ignition noise detection and control circuit comprising:

a first amplifier;

a high-pass filter coupled to said first amplifier for passing signals having a frequency above about 2500 Hz;

a second amplifier having an input coupled to said high-pass filter;

a comparator having a first input coupled to said second amplifier and a reference voltage input terminal, said comparator responding to signals from said second amplifier to provide a control output signal at an output terminal thereof when the input signals from said second amplifier exceed a reference voltage applied to said reference voltage input terminal, a charge pump circuit coupled from said output terminal of said comparator to said first input terminal; and a switch having a control input terminal coupled to the output of said comparator, an input terminal coupled to a vehicle battery line, and an output terminal for applying power to a load circuit.

18. The circuit as defined in claim 17 wherein said charge pump circuit includes a first diode having an anode coupled to the output of said comparator and a cathode coupled to a capacitor having a terminal remote therefrom coupled to ground, a second diode having an anode coupled from the junction of said cathode of said first diode to said capacitor and a cathode coupled to one terminal of a second capacitor having its terminal remote therefrom coupled to the output of said comparator, a third diode having an anode coupled to the junction of said second capacitor and said cathode of said second diode, and a cathode coupled to said first input terminal of said comparator through a resistor to provide hysteresis latching of said comparator.

19. The circuit as defined in claim 18 and further including a voltage reference source comprising a variable resistive divider network coupled from a source of operating power to ground and having an output terminal coupled to said reference voltage terminal of said comparator.

20. The circuit as defined in claim 19 and further including a load circuit coupled to said switch for receiving operating power therefrom.

21. The circuit as defined in claim 20 wherein said load circuit comprises a light source.

22. The circuit as defined in claim 21 wherein said light source comprises a light emitting diode.

* * * * *

UNITED STATES PATENT AND TRADEMARK OFFICE
CERTIFICATE OF CORRECTION

PATENT NO. : 5,903,063
DATED : May 11, 1999
INVENTOR : David A. Blaker

It is certified that error appears in the above-identified patent and that said Letters Patent is hereby corrected as shown below:

Column 2, line 31, "detect" should be --detects--.

Column 2, line 37, "50" should be --50--.

Column 2, line 44, "50" should be --50--.

Column 2, line 46, "al" should be --an--.

Column 2, line 51, after "and" insert --an--.

Column 2, line 53, "receive" should be --receives--.

Column 2, line 54, delete --,--.

Column 2, line 58, "fall" should be --falls--.

Column 2, line 61, "fall" should be --falls--.

Column 2, line 63, "i" should be --is--.

Column 3, line 1, after "17" insert --,--.

Column 3, line 2, "well a" should be --well as--.

Column 3, line 4, "i" should be --is--.

Column 3, line 18, "50" should be --50--.

UNITED STATES PATENT AND TRADEMARK OFFICE
CERTIFICATE OF CORRECTION

PATENT NO.  : 5,903,063
DATED       : May 11, 1999
INVENTOR    : David A. Blaker It is certified that error appears in the above-identified patent and that said Letters Patent is hereby corrected as shown below:

Column 3, line 48, "50" should be --50--.

Column 3, line 48, "al" should be --at--.

Column 3, line 52, "amplified" should be --amplifier--.

Column 4, line 26, "'1'" should be --'1'--.

Column 6, line 4, "sail" should be --said--.

Column 6, line 7, after "amplifier" insert --,--.

Signed and Sealed this

Thirtieth Day of November, 1999

Attest:

Q. TODD DICKINSON

Attesting Officer

Acting Commissioner of Patents and Trademarks